(12) United States Patent
Hsiung et al.

(10) Patent No.: US 7,987,157 B1
(45) Date of Patent: Jul. 26, 2011

(54) LOW-IMPACT REFRESH MECHANISM FOR PRODUCTION DATABASES

(75) Inventors: HanCheng Hsiung, Union City, CA (US); Xinyi David Lai, Danville, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1519 days.

(21) Appl. No.: 10/623,406

(22) Filed: Jul. 18, 2003

(51) Int. Cl.
*G06F 7/00* (2006.01)
*G06F 17/00* (2006.01)

(52) U.S. Cl. ...................................................... 707/649
(58) Field of Classification Search .................. 707/204, 707/1, 649
See application file for complete search history.

(56) References Cited

U.S. PATENT DOCUMENTS

| | | | |
|---|---|---|---|
| 5,956,713 A | | 9/1999 | Bamford et al. |
| 6,014,674 A | * | 1/2000 | McCargar ..................... 707/202 |
| 6,105,030 A | | 8/2000 | Syed et al. |
| 6,578,041 B1 | * | 6/2003 | Lomet ........................... 707/102 |
| 6,636,876 B1 | * | 10/2003 | Ishihara et al. ................ 707/202 |
| 6,957,362 B2 | | 10/2005 | Armangau |
| 6,978,282 B1 | * | 12/2005 | Dings et al. .................... 707/204 |
| 7,003,694 B1 | | 2/2006 | Anderson, Jr. et al. |
| 2002/0032883 A1 | * | 3/2002 | Kampe et al. ..................... 714/16 |
| 2003/0005120 A1 | * | 1/2003 | Mutalik et al. ................. 709/225 |
| 2003/0092438 A1 | * | 5/2003 | Moore et al. .................... 455/423 |
| 2003/0217119 A1 | * | 11/2003 | Raman et al. .................. 709/219 |
| 2004/0030739 A1 | * | 2/2004 | Yousefi'zadeh .............. 709/201 |

OTHER PUBLICATIONS

Ralph Kimball, "The Operational Data Warehouse," www.dbsmag.com, Jan. 1998. (5 Pages).
Labio et al., Efficient Snapshot Differential Algorithms for Data Warehousing, http://www-db.stanford.edu/pub/papers/window-short.ps, 1996, (25 pages).

* cited by examiner

*Primary Examiner* — Charles E Lu
(74) *Attorney, Agent, or Firm* — Robert C. Kowert; Meyertons, Hood, Kivlin, Kowert & Goetzel, P.C.

(57) ABSTRACT

System and method for refreshing databases. A refresh mechanism may allow a data warehouse to remain available to users while the data is being refreshed. Embodiments may be used to perform low impact off-host data loading for databases including, but not limited to, data warehouses and to reduce the data loading window. A checkpoint of the production database may be generated. A database clone may be generated from the checkpoint. In one embodiment, the generated database clone includes references to data in the production database and not the data itself, and is thus storage space-efficient. Data may be loaded to the database clone. The checkpoint may then be switched to be the entry point to the production database after the loading is complete.

20 Claims, 3 Drawing Sheets

LOW-IMPACT REFRESH MECHANISM FOR PRODUCTION DATABASES

BACKGROUND OF THE INVENTION

1. Field of the Invention

This invention is related to the field of computer systems and, more particularly, to a refresh mechanism for databases.

2. Description of the Related Art

A data warehouse may be a repository of historical data that may be used for analyzing business trends, operational efficiency, customer preference, decision effects, etc. A data warehouse is "just another database", and may be a consolidation of other transactional databases and systems. Data warehouse administrators may create different aggregates, indexes, and views of data along different dimension of the business. Data warehouses may be components of an enterprise's Decision Support System. In a data warehouse, an enterprise may collect and organize data into a schema that can then be searched and mined for information using Business Intelligence solutions. These collections of data may serve as the basis of crucial business decisions.

A typical enterprise's data warehouse environment may include, but is not limited to:

One or more data sources—for example, transactional system, point of sales system, ERP system etc.
Utilities/programs to extract data from the data sources.
Utilities/programs to transfer data into a "canonical" form.
Utilities/programs to load canonical data into the data warehouse repository.
Enterprise Data Model to represent the business intelligence.
Data warehouse application software to further aggregate the data for business analysis.
Customized query and report generation/presentation tools.
Smaller "data marts" that include highly aggregated data produced from the data warehouse repository. Customers may, for example, implement data marts with OLAP (Online Analytical Processing) software.

Enterprises generally do not like to mix their data protection environment with the data warehouse. Enterprises may prefer to have dedicated storage for mirrors or on-line backup and may not be comfortable with multiplexing those mirrors for data warehouse purposes. Enterprises may prefer to have separate storage for the data warehouse. Enterprises may prefer to take advantage of idle machine cycles on backup and standby servers. A majority of data warehouse databases are created on regular file system files because of the manageability of file systems.

The complex, sometimes long-running queries of data warehouse applications may have a substantial impact on OLTP (online transaction processing). With the reduction in server and storage cost, many enterprises prefer to run the data warehouse in a separate environment. Separating the data warehouse from production data brings up the issue of refreshing the data warehouse with the up-to-date view. Enterprises may want their data warehouse to be kept as current as possible. The term 'real-time' data warehouse is mentioned a lot.

Enterprises typically need to refresh their data warehouse periodically. Data warehouses are typically updated nightly, but some may be updated weekly, hourly, or at other intervals based on business needs. In general, when a data warehouse is being loaded, administrators take the warehouse off limit for general users. Depending on the amount of data being loaded/processed, this data loading window may be very long. In today's global business environment, it is increasingly difficult to find such a window. The off hours in one location could be the peak hours in another.

There are many different ways to load new data into a data warehouse. Once the new data is loaded, the DBMS may need to perform post process including, but not limited to: rebuilding the index to include the new data and regenerating any aggregates and summaries with the new data. The data is typically made available to users after the post processing finishes.

A typical load process is to take the data warehouse offline, and then do a bulk load via a DBMS vendor's bulk load utility such as the Oracle sqlloader or DB2 load utilities. A common practice is to partition the data monthly. Each month will have its partition or table/tablespace. Only the current month data will be impacted during the load process. Only the index and aggregates related to the last month's data may be rebuilt.

In some environments, administrators may use DBMS vendor's online loading utility to minimize the downtime. With the online load, vendors may pose restrictions on data that may limit the usefulness of the feature. It may be difficult to maintain a point-in-time image of the database unless DBMS keeps a before image of all the related indexes, tables, aggregates, and rules. The cost to maintain a before image copy of data in the database may be significant. The database needs to be carefully set up by an experienced DBA to make use of the online loading feature.

Some administrators may do batch inserts if the changed data is relatively small. All the aggregates and indexes may be updated automatically by the DBMS. However, such cases are not common in real-world situations.

One prior art approach to refreshing data warehouses is to use duplicates of the database and to switch back and forth between the duplicates. For a data warehouse, the size of data may be large, and may exceed many Terabytes. The cost of maintaining two large duplicate sets of data may be very high.

Another prior art approach is to create a copy-on-write/point-in-time snapshot for current users to query the data warehouse, and then to load the new data on to the current file system. In order to maintain the point-in-time copy of the snapshot, any changes to the current file system will be 'pushed' to the snapshots. Administrators will switch the data warehouse back to use current file system once the load process is done. A problem in this process is that the push process creates unnecessary runtime and space usage overhead.

In addition, both of these approaches require running the load process on the same host as the data warehouse. The load process may become a disruptive query in the data warehouse environment itself.

Therefore, it is desirable to provide a refresh mechanism that reduces the impact of data loading on a production data warehouse. It is also desirable to provide a space-efficient mechanism to refresh data warehouses.

SUMMARY

Embodiments of a system and method for refreshing databases are described. Embodiments may provide a refresh mechanism that may allow a database that is served as the repository of a data warehouse system to remain available to end users while the data is being refreshed. Embodiments may be used to perform low impact off-host data loading for databases including, but not limited to, data warehouses and to reduce the data loading window, for example to minutes from potentially hours or days.

A mechanism for refreshing a production database may include, but is not limited to, the following. In one embodiment, the production database is a data warehouse. A storage checkpoint of the production database may be generated. A database clone may be generated from the storage checkpoint. In one embodiment, the generated database clone includes references to data in the production database and not the data itself, and is thus storage space-efficient. Data (e.g. new data) may be loaded to the database clone. In one embodiment, the production database is available for access by users during the loading of data to the database clone. In one embodiment, loading the data to the database clone may be performed on a different host machine than the host machine hosting the production database, for example in a cluster file system. In one embodiment, loading the data to the database clone may be performed on the same host machine hosting the production database. The storage checkpoint may be switched to be the entry point to the production database after the loading is complete. In one embodiment, post-processing may be performed on the database clone prior to said switching. One embodiment may include stopping the production database prior to switching, and starting the production database after switching.

BRIEF DESCRIPTION OF THE DRAWINGS

The following detailed description makes reference to the accompanying drawings, which are now briefly described.

Figure 1:
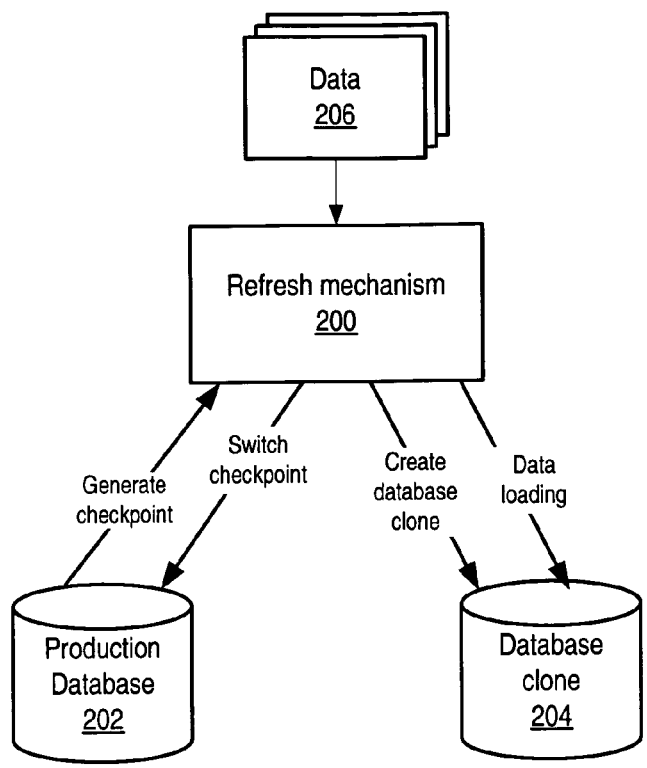
FIG. 1 illustrates a refresh mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for refreshing databases are described. Embodiments may provide a refresh mechanism that may allow a database that is served as the repository of a data warehouse system to remain available to end users while the data is being refreshed. Embodiments may be used to perform low impact off-host data loading for databases including, but not limited to, data warehouses and to reduce the data loading window, for example to minutes from potentially hours or days. In one embodiment, by mounting a storage checkpoint of a primary host's data warehouse on a second host in a cluster environment and loading data into a database clone created from the storage checkpoint, low impact and fast data loading may be realized. In one embodiment, the production database may remain online during the loading. When the loading is complete, the production database may be switched to the database clone. What switches is the entry point into the file system. Embodiments may provide an integrated (into the file system) refresh mechanism to set up the database for loading and to switch to the new database after the loading is complete. Embodiments may be used in a variety of environments including Storage Access Network (SAN) environments and cluster file system environments.

A storage checkpoint, or simply checkpoint, may be defined as a point-in-time copy or snapshot of a database. When a checkpoint of a data warehouse is generated, the checkpoint is a point-in-time copy of the data warehouse. For example, in a data warehouse, the warehouse may be refreshed periodically (e.g. every day). A checkpoint may be generated at a point in time. The checkpoint is a point in time copy for a particular time (the time the checkpoint was taken).

One embodiment of the refresh mechanism may provide an integrated mechanism that allows loading data into a database clone created from a checkpoint, and then making the updated database clone created from the checkpoint the primary data set when the loading finishes. There is preferably only a short interruption of the data warehouse when the updated database clone is turned into the primary database. Embodiments may thus reduce the downtime during the load/post-processing process. Embodiments are preferably straightforward to the customer and require little or no special DBA skills to implement. In one embodiment, the primary database preferably is available only for read access during the refresh process.

Embodiments may provide an integrated refresh mechanism to set up the database for loading and to switch to the new database after the loading is complete. In one embodiment, this mechanism may provide the ability to promote any checkpoint to be the primary file set of the file system, and the ability to support checkpoints on both local and cluster file systems. In addition, embodiments may exploit the nature of data warehouses where there is little write activity on the production database except during loading. By loading into a single storage checkpoint, there may be no need for the file system to perform resource-intensive copy-on-write operations known as "clone push." The loading is preferably fast and the impact on the running production database small.

Embodiments may provide one or more of, but not limited to, the concurrent loading (to the database clone) and running of the database (the production database), reduced disruption of the production database, less storage requirements than prior art solutions, the ability to do off-host loading, and an integrated (e.g., into the file system) solution. One embodiment may provide the ability to quickly make copies of databases—full copies and/or lightweight copies—in SAN (Storage Area Network) or other storage environments. Embodiments may be platform-independent and storage vendor-independent. Embodiments may allow loading to be performed on less-powerful host than the production system. In embodiments, users preferably always have a consistent view of the entire database.

Embodiments may preferably reduce the time that the data warehouse is taken offline during refresh of the data in a data warehouse. Embodiments may preferably perform the refresh transparently to the uses of the data warehouse by working on a database clone in the background, in one embodiment on another machine. Once the refresh is finished, the primary database may be switched to the database clone.

In one embodiment, a checkpoint may be taken, a database clone created from the checkpoint, and new data loaded into the database clone. When complete, the file system may be switched to the database clone created from the checkpoint. In one embodiment, the checkpoint may be disposed after the load is finished. A new checkpoint may be created and the refresh process may begin again.

Embodiments may provide a Command Line and/or Graphic User Interface (GUI) to create checkpoints and to perform the other functions of embodiments of the refresh process described herein. Embodiments may be used with products including one or more of, but not limited to: Oracle, DB2, and Sybase database. One embodiment may be I18N/L10N compliant.

While embodiments are generally described herein applied to data warehouse applications, it is to be understood that some embodiments may be used for providing light impact loading of data into other database applications.

Figure 2:
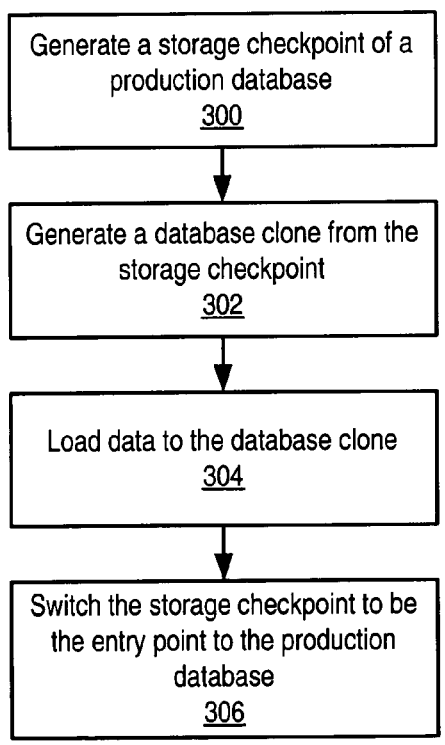
FIG. 2 is a flowchart illustrating a method for refreshing a production database according to one embodiment.

FIGS. 1 and 2 illustrate means for generating a database clone of a production database, means for loading data to the database clone while the production database is available for access by users, and means for switching the storage checkpoint to be the entry point to the production database.

FIG. 1 illustrates a refresh mechanism according to one embodiment. A storage checkpoint of the production database 202 may be generated by refresh mechanism 200. A database clone 204 may be generated from the checkpoint. In one embodiment, the generated database clone 204 includes references to data in the production database 202 and not the data itself, and is thus storage space-efficient. Data 206 (e.g. new data) may be loaded to the database clone 204. In one embodiment, the production database 202 is available for access by users during the loading of data 206 to the database clone 204. In one embodiment, loading the data 206 to the database clone 204 may be performed on a different host machine than the host machine hosting the production database 202, for example in a cluster file system. In one embodiment, loading the data 206 to the database clone 204 may be performed on the same host machine hosting the production database 202. The storage checkpoint may be switched to be the entry point to the production database 202 after the loading is complete. In one embodiment, post-processing may be performed on the database clone 204 prior to said switching. One embodiment may include stopping the production database 202 prior to switching, and starting the production database 202 after switching. In one embodiment, instead of shutting down the production database to switch to the database clone, the production database may be briefly frozen and the database switched to the checkpoint rather than stopping and restarting.

FIG. 2 is a flowchart illustrating a method for refreshing a production database according to one embodiment. In one embodiment, the production database is a data warehouse. As indicated at 300, a storage checkpoint of the production database may be generated. As indicated at 302, a database clone may be generated from the storage checkpoint. In one embodiment, the generated database clone includes references to data in the production database and not the data itself, and is thus storage space-efficient. As indicated at 304, data (e.g. new data) may be loaded to the database clone. In one embodiment, the production database is available for access by users during the loading of data to the database clone. In one embodiment, loading the data to the database clone may be performed on a different host machine than the host machine hosting the production database, for example in a cluster file system. In one embodiment, loading the data to the database clone may be performed on the same host machine hosting the production database. As indicated at 306, the storage checkpoint may be switched to be the entry point to the production database after the loading is complete. In one embodiment, post-processing may be performed on the database clone prior to said switching. One embodiment may include stopping the production database prior to switching, and starting the production database after switching. In one embodiment, instead of shutting down the production database to switch to the database clone, the production database may be briefly frozen and the database switched to the checkpoint rather than stopping and restarting.

Figure 3:
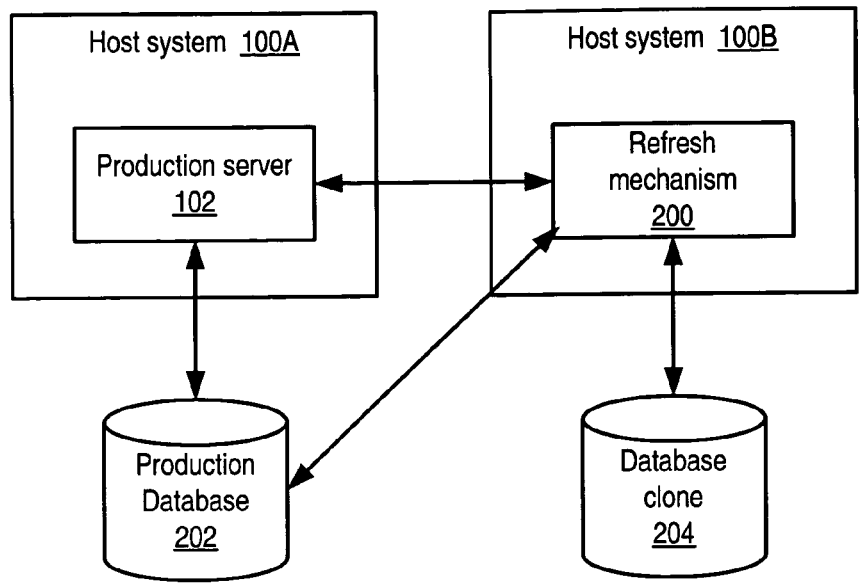
FIG. 3 illustrates performing the refresh on a different host than the production system according to one embodiment.

In one embodiment, a database clone may be created from a checkpoint of a production database. In one embodiment, as illustrated in FIG. 3, the database clone may be created on a different host machine than the production system. New data may be loaded into the database clone, in one embodiment using another machine, for example a cluster file system mounted on a different machine than the production database. During the refresh process, the production database is accessible by users. In one embodiment, once loading data and restructuring the database as necessary is complete, both the production database and the database clone may be shut down. The checkpoint may then be switched to the primary file system. The database clone may be switched to the production database. The production database may then be restarted. The production database has the latest, updated data. The total downtime is between the shutdown and restart.

Note that, in the refresh process, during or after the loading of new data into the database clone, there may be post-processing, e.g. recreating index, recalculating aggregates, etc., that may take additional time. Embodiments may isolate the entire refresh process into the second host to reduce impact to the production system.

Embodiments may requires less storage than prior art systems. In one embodiment, a checkpoint of a file system only stores the delta(s) in the data, where prior art systems typically make a duplicate copy of the file system. When a checkpoint of a file system is created, initially only the metadata is copied. If a user writes into the file system, that particular file system block will store into the checkpoint. Thus, storage requirements may be based on the amount of delta, as only the delta in the file system is stored; not a duplicate copy of the file system.

In a data warehouse environment, data is not typically modified. Typically, the only space required is for newly-loaded data. In embodiments, a database clone includes pointers that point to the original data, and does not include the original data. The database clone initially includes only metadata that points to where the data is. The new data is loaded into the database clone, and updated in the metadata structure for the file system. Thus, in embodiments, one version of a data warehouse may be updated while actively running a current version without duplicating the entire database. The only data storage needed in the database clone is storage for newly-loaded data.

As illustrated in FIG. 3, the data loading into a database clone may be performed by the refresh mechanism on a different host than the production system. In FIG. 3, host system 100A is running host server 102, allowing users to access production database 202 during the refresh process. Host system 100B hosts refresh mechanism 200, which may perform checkpoint generation, creation of database clone 204, loading of data to database clone 204, and post-processing independently of host system 100A, thus preferably reducing or minimizing impact on the production system 100A. Running the data loading on a different host system may ensure that the data loading and database reorganization process do not compete for CPU or other resources with the production server 102 running the production database 202. If the data loading is very CPU intensive and the user does not want to take CPU cycles away from the production system, then the user may choose to implement the system off-host using the cluster file system solution.

In one embodiment, administrators may use a cluster file system to create the cloned database on another host that has access to the same storage. Using a cluster file system may preferably eliminate system resource contention between the data warehouse and the cloned database. Using an off-host clone of the database may eliminate the need to change the name of the database clone during the refresh process.

Figure 4:
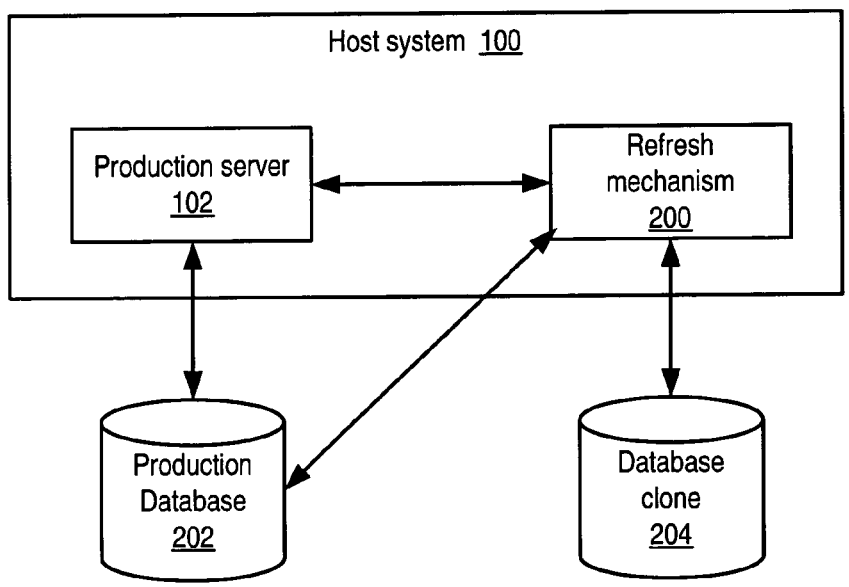
FIG. 4 illustrates performing the refresh on a local file system according to one embodiment.

As illustrated in FIG. 4, one embodiment may be implemented in a local file system. A host system such as host system 100 that has plenty of CPU cycles may not need a cluster file system solution as illustrated in FIG. 3. In this example, host system 100 hosts both production system 102 and refresh mechanism 200.

In one embodiment, to switch the production database to the database clone, the checkpoint may be mounted on a second host after loading and additional processing, as necessary, is complete. The database may be shut down, the checkpoint unmounted, the production database shut down, and the primary file system unmounted. The checkpoint may then be switched to be the primary file system. Once that is done, the primary file system has the image of the checkpoint; the checkpoint gets promoted to the primary file system. Then the production database may be restarted.

In one embodiment, a promotion command to promote the checkpoint to the primary may be exposed in the file system as a file system feature that allows switching a file system checkpoint to the primary file system.

In one embodiment, a read/write snapshot of the data warehouse may be created. The data warehouse may be cloned based on the snapshot with a new database name (or the same database name if it is on a different machine). The load and post processing is performed on the cloned database. For Administrators, the process is performed in the background. Users of the data warehouse can continue to use the production database as if there is no change to the data. In one embodiment, once the load process finishes, a brief downtime may be required to switch the data warehouse to use the updated snapshot of the data.

One embodiment may use a checkpoint to clone the data warehouse database. The load and post process are performed on the cloned database. In this way, there are no clone pushes between the current file system and the checkpoint(s). Once the load and processing is done, the checkpoint may be made the primary of the file system. Therefore, there is no need to copy data back to the primary file system. In one embodiment, after the checkpoint is made the primary, the data warehouse may be restarted with the new data. This restart may be performed immediately after the checkpoint is made the primary.

Figure 5:
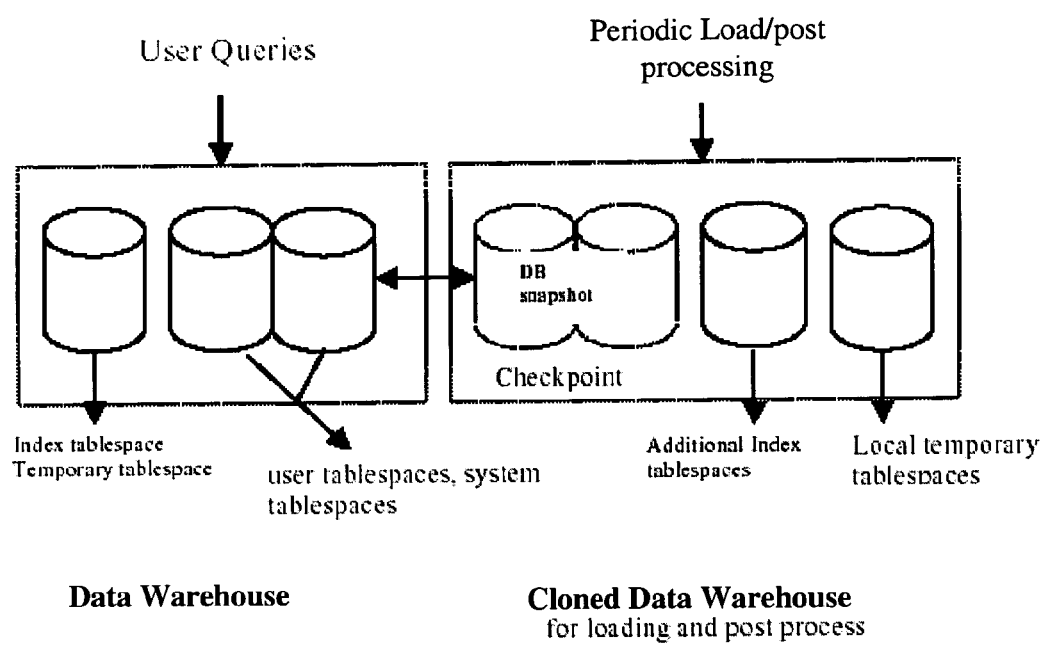
FIG. 5 illustrates an exemplary configuration of the refresh mechanism for a data warehouse according to one embodiment.

FIG. 5 illustrates an exemplary configuration of the refresh mechanism for a data warehouse according to one embodiment. A storage checkpoint represents a point-in-time copy of a file system. One embodiment may create a load checkpoint for the data warehouse database. In one embodiment, the checkpoint includes a checkpoint on every to file system this database resides. In one embodiment, at most one load checkpoint for the database may be allowed at any given time. A load checkpoint may conflict with other checkpoints in a file system. Thus, in one embodiment, if there is a load checkpoint, then preferably no other datafull checkpoints are allowed to be created in the file system. A datafull checkpoint is a checkpoint that can store data. In one embodiment, users are preferably not able to create a load checkpoint if there exists any other datafull checkpoints in the system. Thus, when a load checkpoint is created, no other datafull checkpoints may be present in one embodiment. In one embodiment, one or more dataless checkpoints may be present; a dataless checkpoint has no data. Dataless checkpoints include indications of which blocks have been changed; there is no clone push of data to dataless checkpoints.

One embodiment may support generating checkpoints on each file system while the files are being used. There is no need to shutdown the database. This may depend on the setup of the database; the database may need to be properly quiesced before generating the checkpoints. After generating the checkpoints, the checkpoint may be mounted read/write and a database clone generated based on the checkpoint. Load to the checkpoint has no impact on the primary database under such a configuration.

After the load, post processing may be performed. A typical post processes may include rebuilding or recreating the index(es) and regenerating the aggregate(s). In one embodiment, additional index tablespaces may be set up to include the newly created index and aggregates in, for example, Oracle materialized view or DB2 MQT (Materialized Query Table). In one embodiment, the current aggregates and index space may be reused once the checkpoint is switched to the primary.

In one embodiment, once the load/post processing finishes, the data warehouse may be taken offline for a few minutes to switch to the checkpoint as the primary file system. In one embodiment, the cloned data warehouse database may need to be renamed to its original name. In one embodiment, the cloned database may be linked with the original temporary tablespaces and/or rollback spaces (for Oracle).

In one embodiment, a load cycle may include one or more of, but is not limited to:
Create a LOAD storage checkpoint for the database.
Mount the checkpoint.
Clone the database.
Load the data to the cloned database.
Rebuild the index, aggregates, and any other integrity constraints.
Stop the cloned database.
Stop the original database.
Switch the checkpoint to the primary file system.
Restart the data warehouse database.

Note that, in one embodiment, rather than stopping and restarting the data warehouse, the production database may be temporarily "frozen" to switch to the checkpoint as the primary file system.

In one embodiment, the data warehouse database preferably remains read-only other than the temporary tablespaces. If there are inserts/updates to the primary database while the loading is going on, then whole process may become very complex.

When trying to rebuild an index instead of recreating an index, because the new index pages created on the checkpoint are on a new device, the result may yield a fragmented index, which may impact performance. Thus, in one embodiment, a duplicate index space may be used to recreate index.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  one or more hosts configured to implement:
    a production database; and
    a refresh mechanism configured to:
      generate a storage checkpoint of file system data of the production database;
      generate a database clone, wherein data of the database clone comprises data from the storage checkpoint;
      load new data to the database clone, wherein said load updates the storage checkpoint, wherein the new data is new with respect to the production database, and wherein the production database is available for access by users during said load; and
      after said load, switch from previous file system data of the production database to the storage checkpoint to be the file system data for the production database.

2. The system as recited in claim 1, wherein the refresh mechanism is further configured to perform post-processing on the database clone prior to said switch.

3. The system as recited in claim 1, wherein the refresh mechanism is further configured to:
  stop the production database prior to said switch; and
  start the production database after said switch.

4. The system as recited in claim 1, wherein the production database is a data warehouse.

5. The system as recited in claim 1, wherein the generated database clone includes references to data in the production database.

6. The system as recited in claim 1, wherein the refresh mechanism is configured to perform said loading of new data to the database clone on a different host machine than a host machine hosting the production database.

7. The system as recited in claim 1, wherein the refresh mechanism is configured to perform said loading of new data to the database clone on a host machine hosting the production database.

8. A system, comprising:
  means for generating a storage checkpoint of file system data of a production database;
  means for generating a database clone of a production database, wherein data of the database clone comprises data from the storage checkpoint;
  means for loading new data to the database clone, wherein said loading updates the storage checkpoint, wherein the new data is new with respect to the production database, and wherein the production database is available for access by users during said loading; and
  means for switching from previous file system data of the production database to the storage checkpoint to be the file system data for the production database, wherein said switching is performed after said loading.

9. A method for refreshing a production database, comprising:
  generating a storage checkpoint of file system data of the production database;
  generating a database clone of a production database, wherein data of the database clone comprises the storage checkpoint;
  loading new data to the database clone, wherein said loading updates the storage checkpoint, wherein the new data is new with respect to the production database, and wherein the production database is available for access by users during said loading; and
  after said loading, switching from previous file system data of the production database to the storage checkpoint to be the file system data for the production database.

10. The method as recited in claim 9, further comprising performing post-processing on the database clone prior to said switching.

11. The method as recited in claim 9, further comprising:
  stopping the production database prior to said switching; and
  starting the production database after said switching.

12. The method as recited in claim 9, wherein the production database is a data warehouse.

13. The method as recited in claim 9, wherein the generated database clone includes references to data in the production database.

14. The method as recited in claim 9, wherein said loading new data to the database clone is performed on a different host machine than a host machine hosting the production database.

15. A computer-accessible storage medium comprising program instructions, wherein the program instructions are configured to implement:
  generating a storage checkpoint of file system data of the production database;
  generating a database clone of a production database, wherein data of the database clone comprises the storage checkpoint;
  loading new data to the database clone, wherein said loading updates the storage checkpoint, wherein the new data is new with respect to the production database, and wherein the production database is available for access by users during said loading; and
  after said loading, switching from previous file system data of the production database to the storage checkpoint to be the file system data for the production database.

16. The computer-accessible storage medium as recited in claim 15, wherein the program instructions are further configured to implement performing post-processing on the database clone prior to said switching.

17. The computer-accessible storage medium as recited in claim 15, wherein the program instructions are further configured to implement:
  stopping the production database prior to said switching; and
  starting the production database after said switching.

18. The computer-accessible storage medium as recited in claim 15, wherein the production database is a data warehouse.

19. The computer-accessible storage medium as recited in claim 15, wherein the generated database clone includes references to data in the production database.

20. The computer-accessible storage medium as recited in claim 15, wherein said loading new data to the database clone is performed on a different host machine than a host machine hosting the production database.

* * * * *